United States Patent
Fiebiger et al.

(10) Patent No.: US 12,241,565 B2
(45) Date of Patent: Mar. 4, 2025

(54) PREVENTING CONTROL-INDUCED OSCILLATIONS OF THE POSITION OF A VALVE MEMBER IN A VALVE WITH PNEUMATIC ACTUATOR

(71) Applicant: SAMSON AKTIENGESELLSCHAFT, Frankfurt am Main (DE)

(72) Inventors: Andreas Fiebiger, Taunusstein (DE); Fausto Crespo Vidal, Langenselbold (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 97 days.

(21) Appl. No.: 18/207,929

(22) Filed: Jun. 9, 2023

(65) Prior Publication Data
US 2023/0400120 A1    Dec. 14, 2023

(30) Foreign Application Priority Data
Jun. 10, 2022   (DE) .......................... 10 2022 114 745

(51) Int. Cl.
*F16K 37/00*   (2006.01)
*F15B 5/00*   (2006.01)
(Continued)

(52) U.S. Cl.
CPC ............ *F16K 37/0041* (2013.01); *F15B 9/03* (2013.01); *F15B 19/005* (2013.01);
(Continued)

(58) Field of Classification Search
CPC ........ F15B 9/03; F15B 19/005; F15B 21/087; F15B 5/006; F15B 2211/6303;
(Continued)

(56) References Cited

U.S. PATENT DOCUMENTS 4,392,417 A * 7/1983 Johannsen ......... G05D 16/2073
                                                   236/14
4,436,110 A * 3/1984 Leeuwma ............. F02D 19/022
                                                   251/129.05
(Continued)

FOREIGN PATENT DOCUMENTS

DE         29612346 U1    8/1997
DE     102007058517 A1    6/2009
(Continued)

OTHER PUBLICATIONS

Extended European Search Report, EP 23177714, Oct. 5, 2023, pp. 1-5.
DE 10 2022 114 745 Search Report Mailed Jan. 27, 2023.

*Primary Examiner* — William M McCalister
(74) *Attorney, Agent, or Firm* — GrowIP Law Group LLC

(57) ABSTRACT

A method for preventing control-induced oscillations in a valve with a pneumatic actuator and position control with an integrating component, including the following steps: Checking whether oscillations of the valve member occur by counting the zero crossings or extreme values of the control difference. If oscillations were detected, it is checked whether they result from oscillations of the set point. If not, the dead zone is increased and/or the gain parameter is decreased. If no oscillations were detected, it is checked whether wear in the drive has exceeded a predetermined measure. If so, the dead zone is decreased and/or the gain parameter is increased. In this way, oscillations caused by the I-component of the control can be detected and stopped. Further changes to the parameters are only made when friction is expected to have decreased due to wear.

16 Claims, 3 Drawing Sheets

(51) Int. Cl.
*F15B 9/03* (2006.01)
*F15B 19/00* (2006.01)
*F15B 21/08* (2006.01)
*F16K 31/12* (2006.01)
*G05B 11/42* (2006.01)

(52) U.S. Cl.
CPC ............ *F15B 21/087* (2013.01); *F16K 31/12* (2013.01); *G05B 11/42* (2013.01); *F15B 5/006* (2013.01); *F15B 2211/6303* (2013.01); *F15B 2211/6313* (2013.01); *F15B 2211/6336* (2013.01); *F15B 2211/6656* (2013.01); *F15B 2211/8613* (2013.01); *F15B 2211/864* (2013.01); *F15B 2211/8646* (2013.01); *F15B 2211/875* (2013.01); *F15B 2211/8855* (2013.01); *Y10T 137/7787* (2015.04)

(58) Field of Classification Search
CPC ...... F15B 2211/6313; F15B 2211/6336; F15B 2211/6656; F15B 2211/8613; F15B 2211/864; F15B 2211/8646; F15B 2211/875; F15B 2211/8855; G05B 11/42; F16K 37/0041; F16K 31/12; Y10T 137/7787
USPC ..................................................... 137/487.5
See application file for complete search history.

(56) References Cited

U.S. PATENT DOCUMENTS

| | | | | |
|---|---|---|---|---|
| 5,957,393 | A * | 9/1999 | Price | B05B 7/1404 239/654 |
| 7,636,614 | B2 * | 12/2009 | Dykstra | G05B 23/0254 700/282 |
| 2001/0035512 | A1 * | 11/2001 | Messer | F16K 31/02 700/282 |
| 2001/0037159 | A1 | 11/2001 | Boger et al. | |
| 2003/0121409 | A1 * | 7/2003 | Lunzman | F15B 13/0442 91/459 |
| 2003/0145890 | A1 * | 8/2003 | Newman | F02M 21/0233 137/487.5 |
| 2014/0283508 | A1 * | 9/2014 | Hiraku | E02F 9/2235 60/328 |
| 2018/0153102 | A1 * | 6/2018 | Dunn | F15B 1/033 |

FOREIGN PATENT DOCUMENTS

| | | |
|---|---|---|
| DE | 102007058517 B4 | 7/2018 |
| JP | H04203601 A | 7/1992 |
| WO | 2006105677 A2 | 10/2006 |
| WO | 2010054657 A1 | 5/2010 |

* cited by examiner

PREVENTING CONTROL-INDUCED OSCILLATIONS OF THE POSITION OF A VALVE MEMBER IN A VALVE WITH PNEUMATIC ACTUATOR

CROSS-REFERENCE TO RELATED APPLICATION

This application claims the benefit of the filing date of German Application No. DE 10 2022 114 745, filed on Jun. 10, 2022, the contents of which are hereby incorporated by reference in their entirety.

TECHNICAL FIELD

The disclosure relates to a method for preventing control-induced oscillations of the position of a valve member in a valve with pneumatic actuator and position control of the valve member, as well as corresponding devices, in particular a positioner, a valve, a process plant, and a corresponding computer program and computer-readable medium.

It is known from control engineering that control methods such as proportional control, integral control, differential control or combinations thereof can be used to determine a manipulated variable (e.g. a current, a voltage, a pressure) for controlling a controlled variable as a function of a control difference between an actual value of the controlled variable and a setpoint value.

A proportional component (P-component) of the control is calculated directly by weighting the control difference between the actual value and the setpoint value. The proportional range is the linear range of the controller and operates both below and above the setpoint. The main disadvantage of a P-control is the remaining permanent control deviation.

An integral component (I-component) is calculated as a time integral of the control difference or control deviation and multiplied by a gain factor $K_i$. The manipulated variable changes with the duration of the control deviation, since the continuous control deviations are added up by the I-component of the controller. As a result, the manipulated variable changes in such a way that the control deviation finally becomes zero. However, an excessive manipulated variable generated by an I-component can only be reduced again if the sign of the control deviation changes, i.e. if the setpoint has been exceeded or undershot at least once. For controllers with an I-component, oscillations around the setpoint may therefore occur, which are generally undesirable.

Finally, a differential component (D-component) forms a part of the control proportional to the rate of change of the control difference over time. Consequently, the D-component of the controller does not react to the duration, but to the speed at which the control difference between setpoint and actual value changes. Due to the rate of change of the actual value, the manipulated variable increases faster than with a P-controller. With the D-component, a fast, overshoot-free approach to the setpoint is achieved. The controller reacts faster than a pure P-controller. The disadvantage here is also a remaining permanent control deviation.

The I-component of a controller can typically be adjusted by two parameters, dead zone and gain factor $K_i$. The dead zone suppresses noise components in the signal of the control difference in the controlled state, which can arise, for example, through superimposition of the controlled variable with a higher-frequency interference signal. In this way, it prevents undesired oscillation of the manipulated variable of the controller. The dead zone has an adjustable width. If the control difference is located within this, it is set to the value zero. The gain factor $K_i$ is an adjustable value which is multiplied with the signal of the integrating element of the controller to obtain the manipulated variable of the controller. Control deviations are reduced more quickly with high gain, but this increases the risk that the control variable will oscillate. Too high a gain may lead to permanent oscillation.

BACKGROUND

In known valve positioners in which the control has an I-component, oscillations of the position control can occur if the parameters of the I-component of the control are not optimally set. This is due to the fact that the pneumatic actuator of a valve, especially in combination with seal types where the difference between static and sliding friction is particularly large, only reacts to control pulses with a delay. The immediate cause of this is the compressibility of the air contained in the actuator. In the case of high static friction, a relatively high pressure must be built up in the actuator to overcome it. Once it has been overcome, the valve member moves beyond the desired set position with relatively low sliding friction, since the pressure in the actuator falls only slowly due to the above-mentioned compressibility of the compressed air in the actuator. The result is a hysteresis between the manipulated variable of the controller (e.g. current or pressure) and the position of the valve member. The control with integral component may not find a rest position in such a situation.

Since the friction of the seal, typically a stuffing box, changes due to wear, the parameters of the control must be adjusted overtime to ensure consistent control performance. For example, friction may decrease when the packing material in the packing gland no longer presses as strongly on the valve stem due to wear. This effect occurs, for example, when graphite is used as the packing material. In the case of adjustable packings, however, the friction can also increase if, for example, the packing is retightened and the packing material thus again presses more strongly on the valve stem.

The known valve positioners often have difficulties in recognizing such oscillation states caused by the control. If such oscillations are detected, corrections are often too large—for example, the width of the dead zone can be adjusted to the amplitude of the oscillation. This leads to large reductions in the achieved control quality. As a consequence, the width of the dead zone has to be reduced again, which can be done e.g. time-controlled. However, if the conditions at the valve have not changed, this can lead to oscillations occurring again.

Publication DE 10 2007 058 517 B4 discloses a digital position encoder for operating a valve member with a positioner in a process engineering plant. Here, too, disturbance variables such as noise of the input signals, hysteresis, adhesion and sliding resistances can lead to undesired oscillations of the positioner. These are countered by a dead zone which suppresses changes in the output signals of the position encoder as soon as the absolute value of the static or dynamic differences between the setpoint and actual states (i.e. the control difference) falls below certain limit values. The dead zone is asymmetrical and its orientation depends on whether the setpoint is rising or falling. A disadvantage of this is that the width of the dead zone is set only once and, for example, changes in friction during operation are not checked and taken into account.

From the publication WO 2006/105677 A2 a method and a device for the suppression of vibrations in a plant with an actuator for the operation of a damper or a valve are known.

This system uses a microprocessor that executes an algorithm that provides adaptive filtering using wavelet analysis and a lag element. This dampens all oscillations in the system. An additional detection of load jumps is therefore required so that the damping can be switched off when an intended jump of the setpoint value occurs.

Publication JP H04 203 601 A describes a system for stabilizing the opening or closing control of a valve, in which a compensation circuit using the so-called Smith method is connected in parallel between the input and output sides of the controller, whereby opening or closing oscillations of a valve actuator with long compressed air lines are to be prevented.

SUMMARY

Problem

It is the object of the disclosure to specify methods and devices which prevent or at least minimize the occurrence of control-induced oscillations in a valve with a pneumatic actuator and position control of the valve member with integral component.

Solution

This object is solved by the subject matter of the independent claim. Advantageous embodiments of the subject-matter of the independent claim are characterized in the sub-claims. The wording of all claims is hereby incorporated into this description by reference.

The use of the singular shall not exclude the plural, which is also to apply in the reverse sense, unless otherwise disclosed.

In the following, individual method steps are described in more detail. In a preferred variant of the disclosure, the steps are carried out in the order indicated. However, the steps need not necessarily be carried out in the order indicated, and the method to be described may also comprise further unmentioned steps.

To solve the problem, a method for preventing control-induced oscillations of the position of a valve member in a valve with a pneumatic actuator and position control of the valve member is proposed. As a prerequisite, the position control of the valve member has an integrating component which has a gain parameter and a dead zone. The method comprises the following steps:

The presence of oscillations of the position of the valve member is verified.

If oscillations are detected, it is checked whether the detected oscillations result from oscillations of the setpoint value of the position of the valve member.

In case the oscillations do not result from oscillations of the setpoint of the position of the valve member, the dead zone is increased and/or the gain parameter is decreased.

In the event that no oscillations were detected, it is checked whether wear in the pneumatic actuator of the valve member has exceeded a predetermined measure.

If this is the case, the dead zone is decreased and/or the gain parameter is increased.

In this way, oscillations caused by unfavorably set parameters of the I-component of the control can be detected and stopped. The parameters of the I-component of the control are only changed further when wear (e.g. on a seal or on the packing material) is expected to have reduced the friction and the I-component of the control can be set more aggressively without control-induced oscillations being expected again. The control tolerance is dynamically adapted to changed frictional forces in the valve actuator.

To determine the oscillations, zero crossings or extreme values of the control difference between the setpoint and actual value or extreme values of the actual value of the position of the valve member may be counted. If a sufficient number of zero crossings or extreme values of the control difference or the actual value occur within a specified time, oscillations can be assumed.

Control-induced oscillations of the position of the valve member can be detected particularly well if extreme values of the setpoint value of the position of the valve member are counted to check whether the detected oscillations result from oscillations of the setpoint value of the position of the valve member. Oscillations of the position of the valve member that do not result from oscillations of the setpoint value of the position of the valve member are diagnosed when at least three, preferably at least four zero crossings or extreme values of the control difference or extreme values of the actual value are counted between two extreme values of the setpoint value and when the actual value of the position or the control difference has left the dead zone.

Oscillations caused by unfavorably set parameters of the I-component of the control must be distinguished from oscillations specified by the setpoint value of the position of the valve member (which could thus be desired). This can be achieved particularly well if a period duration of the setpoint value and a period duration of the control difference are determined. The detected oscillations are identified as oscillations of the setpoint value if the period duration of the setpoint value is not greater than the period duration of the control difference. Then the setpoint value oscillates at least as fast as the control difference, from which it can be concluded that these oscillations are not caused by special features of the control used.

To prevent changes being made to the parameters of the I-component of the control while the control is still settling, in the event that oscillations have been detected that do not result from oscillations of the setpoint value of the position of the valve member, the increase of the dead zone and/or the decrease of the gain parameter should only take place when the amount of the control difference is below a first predetermined threshold and a predetermined time period has elapsed.

Excessively coarse changes of the control parameters, which may require opposite further corrections, can be avoided if changes of the dead zone and/or the gain parameter are made particularly sensitively. For this purpose, the dead zone is changed by a maximum of 0.1% in each individual case. If, on the other hand, the gain parameter is changed, changes by a maximum of 33%, preferably by a maximum of 25%, particularly preferably by a maximum of 10% are permissible.

A particularly simple procedure for avoiding unnecessary attempts to set the parameters of the I-component of the control more aggressively is achieved if a second threshold for the total travelled stroke and a third threshold for the number of directional changes of the stroke of the valve member are used as a predetermined measure for the wear in the pneumatic actuator of the valve member. Only when the valve member has traveled the distance thus specified with a correspondingly large number of changes of direction—which place particular stress on the packing—are the parameters set more strictly as described above, since it is expected that under these circumstances the friction has decreased due to wear. With this procedure, it is additionally advantageous that no pressure sensor is required in the positioner or in the pneumatic actuator of the valve.

If, on the other hand, at least one pressure sensor is present at the pneumatic actuator and/or at the positioner, with which the pressure in the actuator of the valve is determined, a friction decrease due to wear can be determined particularly precisely if a stroke-pressure curve is created by means of the pressure determined by the pressure sensor. A fourth threshold for the width of a hysteresis in the stroke-pressure curve is then used as a predetermined measure of wear in the pneumatic actuator of the valve member. This hysteresis is caused by friction in the actuator of the valve, thus the width of the hysteresis decreases as friction is reduced. The fourth threshold can be determined, for example, during the first commissioning of the valve on the basis of a stroke-pressure curve recorded in the non-worn state.

A decision to set the control parameters of the I-component of the control more aggressively, i.e. to decrease the dead zone and/or to increase the gain parameter, should only be made if it is clear that the state of the control is stable. This can be ensured if the dead zone is decreased and/or the gain parameter is increased only if, in addition, the setpoint value of the position of the valve member changes more slowly than a fifth predetermined threshold and/or there is a sign change of the control difference and/or the actual value of the position of the valve member is stationary (i.e. stably controlled) within the dead zone.

Excessive changes of the control parameters can be prevented if the decrease of the dead zone and/or the increase of the gain parameter is postponed until the actual value of the position of the valve member has left the dead zone. After a decision has been made to set the control more aggressively, it is therefore waited until the valve member moves to a new position. By means of the oscillation detection, it is possible to check directly in this new position whether the newly set parameters are set too aggressively.

If the second threshold for the total travelled stroke and the third threshold for the number of directional changes of the stroke are used for wear detection, then when the dead zone is decreased and/or the gain parameter is increased, stored values for the total travelled stroke and the number of directional changes of the stroke of the valve member should be set to zero. The corresponding counters are thus re-initialized, since the control has been adapted to the wear condition that is now present.

If the width of the hysteresis in the stroke-pressure curve is used for wear detection, the fourth threshold for the width of the hysteresis should be redefined reset when the dead zone is decreased and/or the gain parameter is increased, since the control has been adapted to the wear condition that is now present.

The problem is also solved by a positioner for a valve with pneumatic actuator, wherein the control of the positioner has an integrating component. The positioner has means suitable for carrying out the steps of a method described further above, including a position sensor for measuring the actual value of the stroke of the valve member and possibly a pressure sensor. The means may include, for example, a processing unit, control electronics, a digital signal processor (DSP), a microcontroller, a computer, or a plurality thereof in a network with appropriate programming. This programming may be implemented, for example, within a fixed circuit arrangement of the processing unit, control electronics, DSP and/or microcontroller, or using field programmable gate arrays (FPGA). The means may also consist of the positioner being connected to a control room or the like, which has the corresponding computing units or corresponding programming and transmits control signals back to the positioner.

In addition, the problem is solved by a valve with a positioner as described above, and by a process plant with such a valve.

The solution of the problem is further served by a computer program comprising instructions which cause the positioner as described above to execute the method steps described further above, as well as by a computer-readable medium on which the described computer program is stored.

Further details and features result from the following description of preferred embodiments in connection with the drawings. The respective features may be implemented individually or in combination with one another. The possibilities to solve the problem are not limited to the embodiments.

BRIEF DESCRIPTION OF THE DRAWINGS

The embodiment are shown schematically in the figures. Identical reference numerals in the individual figures designate identical or functionally identical elements or elements that correspond to one another in terms of their functions. In detail.

DETAILED DESCRIPTION

Figure 1:
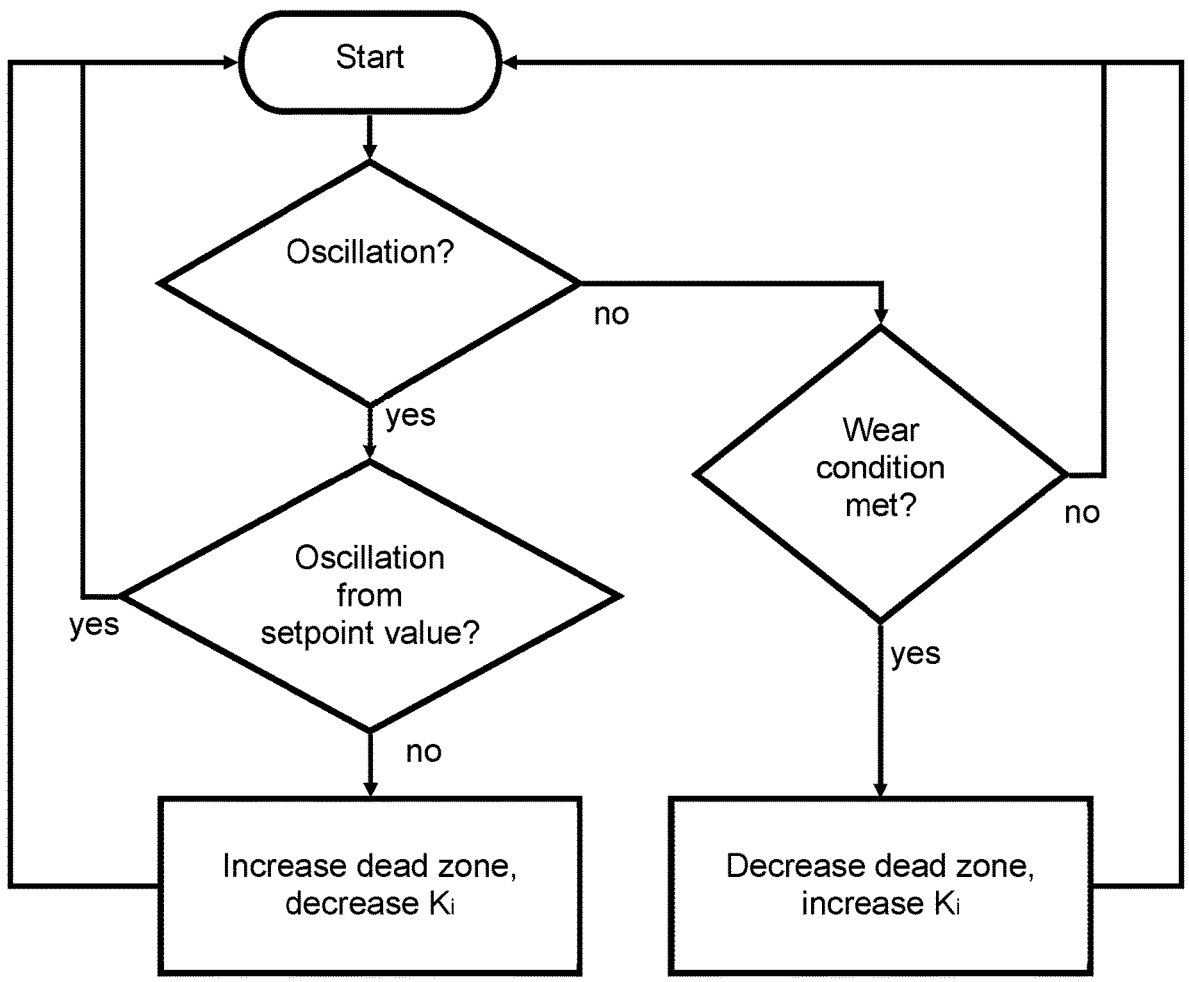
FIG. 1 shows a flowchart of the described method.

In the flow chart shown in FIG. 1, the method runs in a loop. Such an embodiment is particularly useful, for example, in a program-controlled form of the method. The loop may be repeated continuously, for example, or it runs at fixed, periodic intervals, e.g. once per hour. After the start of the method, it is first queried whether there is an oscillation of the valve member, i.e. an oscillation of the actual value x. If this is the case, it is determined whether there is an oscillation of the valve member. If this is the case, it is determined whether the oscillation originates from an oscillation of the setpoint value w. Such oscillations should not be prevented by the described method and are therefore not processed. If the oscillation originates from an oscillation of the setpoint value, the loop is therefore terminated and the method returns to the starting point.

However, if the oscillation is not specified by an oscillation of the setpoint value, the necessary steps are taken to increase the dead zone and/or decrease the gain parameter $K_i$. In the embodiment of the method shown in FIG. 1, both of the above changes are provided, but it is of course possible to adjust only one of these parameters and leave the other constant. After these adjustments, the loop is terminated and the method returns to the starting point.

If no oscillation is detected during the first query, the described method checks whether the wear conditions applicable to the respective valve are fulfilled. This can occur, for example, by the value of a stroke counter exceeding a second threshold and a likewise counted number of directional changes also exceeding a third threshold, or, for example, by the width of the friction-induced hysteresis in a measured stroke-pressure curve falling below a provided fourth threshold. If the wear conditions are not fulfilled, no change of the parameters of the control of the valve is required, the loop is thus terminated. If the wear conditions are fulfilled, the necessary steps are carried out to decrease the dead zone and/or increase the gain parameter $K_i$. In the embodiment of the method shown in FIG. 1, both of the above changes are provided, but it is of course possible to adjust only one of these parameters and leave the other constant. After these adjustments, the loop is terminated and the method returns to the starting point.

Oscillation detection is typically performed by counting zero crossings of the control deviation $e=w-x$. Alternatively, the extreme values of the control difference can also be counted. A further, particularly robust alternative is counting of extreme values of the actual value x. In order to determine whether a detected oscillation is specified by the setpoint value (and thus "wanted"), the period durations of the control difference e and the setpoint value w are preferably compared. A check is made whether the period duration of the setpoint value w is greater by a certain factor, e.g. 3 or 4, than the period duration of the control difference e. If this is the case, the control difference oscillates significantly faster than the setpoint value, thus it is ensured that the observed oscillation is not being specified by the setpoint value.

Adjustments to the control parameters, i.e. in particular to the width of the dead zone and to the gain parameter $K_i$, are preferably made in a very sensitive manner. Particularly preferably, the dead zone is changed by a maximum of ±0.1%, while larger changes of up to ±33%, preferably up to ±25%, particularly preferably up to ±10% to the gain parameter $K_i$ are possible.

Figure 2:
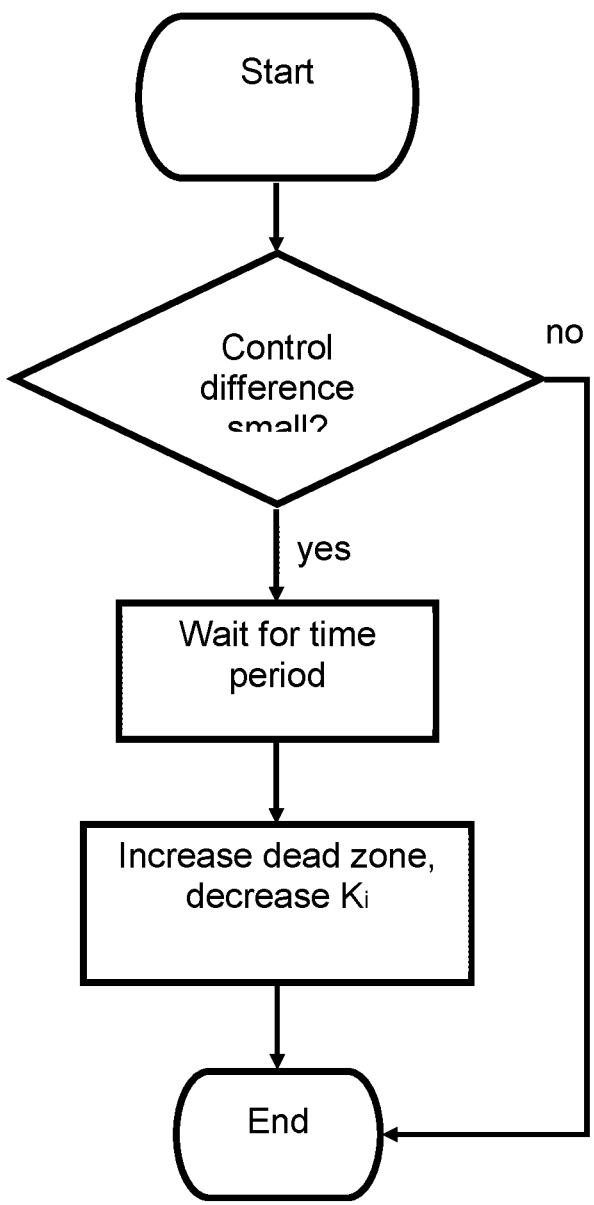
FIG. 2 shows a partial flow chart for the section of an embodiment of the described method in which the dead zone is increased and/or the gain parameter is decreased.

A possible flow chart for the steps necessary to increase the dead zone and/or decrease the gain parameter $K_i$ is shown in FIG. 2. Immediately after the start, an additional check can be provided to determine whether the setpoint value changes slowly, i.e. whether the magnitude of the first time derivative of the setpoint value is below a specified threshold and does not oscillate (not shown). However, this check is optional and not absolutely necessary, since it has usually already been carried out in the superordinate part of the described process, which is shown in FIG. 1.

It is first determined whether the magnitude of the control difference is small, i.e. below a first predetermined threshold. Typically, this first threshold is selected such that it is ensured that the actual value x already approaches the setpoint value w—but may still lie outside the dead zone. If this is not fulfilled, this procedure is terminated or aborted, since a change of the control parameters would not make sense. However, if the control difference is small enough, a predetermined time period is waited for, which should be adapted to the normal settling behavior of the control. After that, one can be sure that the settling of the controlled system is completed. Only then are the control parameters changed, i.e. preferably both the dead zone is increased and the gain parameter $K_i$ is decreased. Of course, it is also possible to adjust only one of these parameters and leave the other constant.

Figure 3:
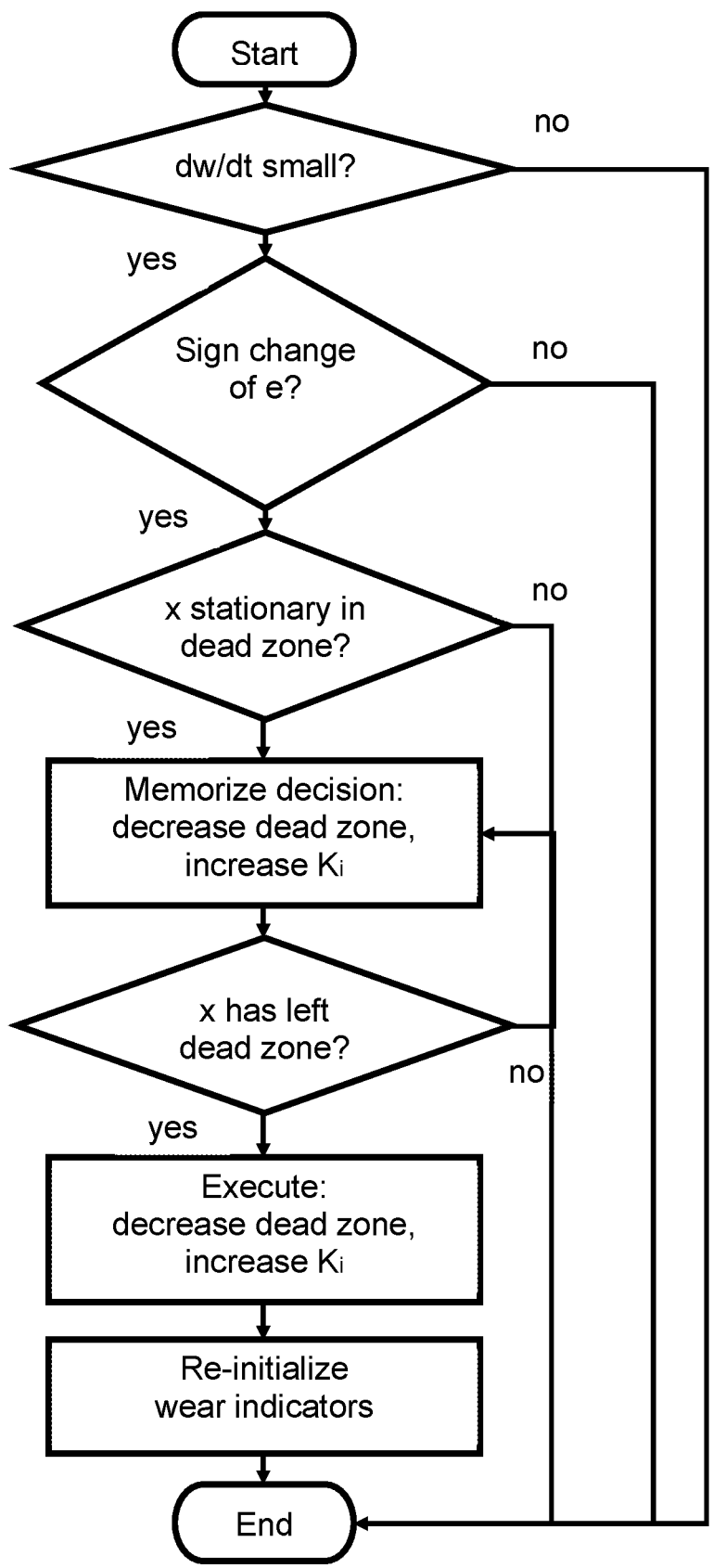
FIG. 3 shows a partial flow chart for the section of an embodiment of the described method in which the dead zone is decreased and/or the gain parameter is increased.

A possible flowchart for the steps necessary to decrease the dead zone and/or increase the gain parameter $K_i$ is shown in FIG. 3. First, further prerequisites are checked: Does the setpoint value w change only slowly, i.e. below a fifth predetermined threshold? Is there a sign change of the control difference? Is the setpoint value stationary in the dead zone? In the embodiment of the method shown in FIG. 3, these conditions are checked successively. However, other, less preferred embodiments are also possible, in which only two or only one of these prerequisites are checked. If they are not fulfilled, this procedure is terminated or aborted, since it would not make sense to change the control parameters.

However, if the above conditions are met, the procedure remembers the decision that the dead zone should be decreased and/or the gain parameter $K_i$ should be increased. This can occur in different ways, depending on exactly how the method is controlled and on what kind of device it runs. For example, a bit provided for this purpose may be set in an electronic buffer, e.g. in the main memory of a computing device, or a value is assigned to a variable, for example.

Then it is waited until the actual value x has left the dead zone again. This means that the valve member must move before the control parameters are changed to a more aggressive control. This ensures that if the parameters are changed too far, an oscillation can be detected again very quickly, whereupon the parameters would again be adjusted towards a less aggressive control. In the sequence shown in FIG. 3, this waiting is achieved by a sub-loop which preferably runs periodically: If the actual value has not left the dead zone, the decision just described is further memorized.

If the actual value has left the dead zone, however, preferably both the dead zone is reduced and the gain parameter $K_i$ is increased. It is of course also possible to adjust only one of these parameters and leave the other constant. Once this change has been made, the wear indicators are re-initialized, since the control has just been adapted to the reduced friction due to wear. If they are used, the stroke and direction change counters are therefore set to zero. If instead the width of the hysteresis of the stroke-pressure curve serves as wear indicator, the fourth threshold for the width of this hysteresis is re-determined.

GLOSSARY

Control Difference, Control Deviation

The control difference or control deviation e is understood as the difference between setpoint value w and actual value x: $e=w-x$.

Control with Integrating Component

Integrating controllers are used to completely compensate control deviations at every operating point. As long as the control deviation is not equal to zero, the amount of the manipulated variable changes. Only when reference and controlled variable, i.e. setpoint w and actual value x, are equal, at the latest, however, when the manipulated variable reaches its system-dependent limit value (e.g. maximum voltage), the control is steady-state. The mathematical formulation of this integral behavior is: The value of the manipulated variable y is proportional to the time integral of the control difference e:

$$y=K_i \int e \, dt$$

Here, the gain parameter $K_i$ is usually defined as the reciprocal of the integration time.

Stuffing Box

The stuffing box or gland or packing, formerly also called a cloth gland because felt was used as a sealing material, is a sealing element in mechanical engineering. It seals a rotating shaft or a reciprocating rod from a housing against the pressure of a liquid or vapor as well as against penetrating dirt or escaping lubricant.

A stuffing box consists of the stuffing box packing (the actual seal) and a gland (a flange-like sleeve) with which the stuffing box packing is axially compressed by means of bolts or springs. In the case of elastic sealing material, the axial compression also achieves radial compression of the stuffing box packing on the shaft. In this way, the sealing gap can be adjusted to a minimum suitable for the operating conditions.

Disadvantages: A small amount of leakage cannot be completely ruled out. Due to the large contact area, combined with high pressure, which is required for low-leakage sealing, stuffing box packings cause relatively high friction.

Advantages: Since the sealing pressure is applied externally via the packing gland, many suitable materials are available (e.g. fiber materials, graphite). Some of these can also be used at high temperatures and with aggressive media, for which the elastomer seals predominantly used today (e.g. O-rings, radial shaft seals, etc.) are not suitable. Another advantage is that by retightening the packing gland, leakages caused by wear of the sealing material can be reduced again.

Dead Zone (Also Dead Band)

A dead zone is a range of input values of a control or signal processing system for which the output value is zero. In control systems, such a dead zone is generally used to suppress undesirably frequent cycles of switching operations. In control systems, the dead zone is typically a tolerance range for the actual value x around the setpoint value w, or—equivalently—a tolerance range for the control difference e around zero. Typically, a dead zone is connected upstream of the actual controller or only of the integrating component of the controller.

The invention claimed is:

1. A method for preventing control-induced oscillations of a position of a valve member in a valve with pneumatic actuator and position control of the valve member,
    wherein the position control of the valve member has an integrating component;
    wherein the integrating component of the position control has a gain parameter and a dead zone;
    the method comprising the following steps:
        verifying the presence of oscillations of the position of the valve member;
        in the event that oscillations were detected:
            checking whether the detected oscillations result from oscillations of a set point of the position of the valve member;
            in case the oscillations do not result from oscillations of the set point of the position of the valve member, increasing the dead zone and/or decreasing the gain parameter;
        in the event that no oscillations were detected:
            checking whether wear in the pneumatic actuator of the valve member has exceeded a predetermined measure;
            if wear in the pneumatic actuator has exceeded the predetermined measure, decreasing the dead zone and/or increasing the gain parameter.

2. The method according to claim 1, further comprising:
    checking whether the detected oscillations result from oscillations of the setpoint value of the position of the valve member, and determining a period duration of the setpoint value and a period duration of the control difference, and
    identifying the detected oscillations as oscillations of the setpoint value if the period duration of the setpoint value is not greater than the period duration of the control difference.

3. The method according to claim 1, wherein
    in the case where oscillations have been detected which do not result from oscillations of the setpoint of the position of the valve member, increasing the dead band and/or decreasing the gain parameter take place only if the control difference is below a first predetermined threshold and a predetermined time period has elapsed.

4. The method according to claim 1, further comprising:
    changing the dead zone in each individual case by a maximum of 0.1%; and/or
    changing the gain parameter in each individual case by a maximum of 33%.

5. The method according to claim 1, further comprising:
    changing the dead zone in each individual case by a maximum of 0.1%; and/or
    changing the gain parameter in each individual case by a maximum of 25%.

6. The method according to claim 1, further comprising:
    changing the dead zone in each individual case by a maximum of 0.1%; and/or
    changing the gain parameter in each individual case by a maximum of 10%.

7. The method according to claim 1, further comprising:
    using a second threshold for the total travelled stroke and a third threshold for the number of directional changes of the stroke of the valve member as a predetermined measure for the wear in the pneumatic actuator of the valve member.

8. The method according to claim 1, wherein the pneumatic actuator and/or the position control of the valve member has at least one pressure sensor to determine the pressure in the actuator, the method further comprising:
    generating a stroke-pressure curve based on the pressure determined by the pressure sensor; and
    using a fourth threshold for the width of a hysteresis in the stroke-pressure curve as a predetermined measure for the wear in the pneumatic actuator of the valve member.

9. The method according to any claim 1, wherein decreasing the dead zone and/or increasing the gain parameter only if in addition
    the setpoint value of the position of the valve member changes more slowly than a fifth predetermined threshold, and/or
    there is a sign change of the control difference, and/or
    the actual value of the position of the valve member is stationary within the dead zone.

10. The method according to claim 1, further comprising:
    postponing the decreasing the dead zone and/or the increasing of the gain parameter until the actual value of the position of the valve member has left the dead zone.

11. The method according to claim 7, further comprising:
    when the dead zone is decreased and/or the gain parameter is increased, setting stored values for the total travelled stroke and the number of directional changes of the stroke of the valve member to zero.

12. Method according to claim 8, further comprising:
    when the dead zone is decreased and/or the gain parameter is increased, redefining the fourth threshold.

13. A positioner for a valve with a pneumatic actuator,
    wherein a control of the positioner has an integrating component,
    the positioner configured to carry out the steps of the method according to claim 1.

14. A valve having a positioner according to claim 13.

15. A process plant with a valve according to claim 14.

16. A non-transitory computer-readable medium having stored thereon program instructions that upon execution by a processing unit, control electronics, a digital signal processor (DSP), a microcontroller, a computer, or a plurality thereof in a network which cause the positioner according to claim 14 to perform a set of method steps according to method claim 1.

* * * * *